US006816246B2

United States Patent
Akiyama et al.

(10) Patent No.: US 6,816,246 B2
(45) Date of Patent: Nov. 9, 2004

(54) METHOD FOR MEASURING LIGHT TRANSMITTANCE AND APPARATUS THEREFOR

(75) Inventors: Hisanori Akiyama, Shinjyuku-ku (JP); Toshiro Yoda, Shinjyuku-ku (JP)

(73) Assignee: Hoya Corporation, Tokyo (JP)

( * ) Notice: Subject to any disclaimer, the term of this patent is extended or adjusted under 35 U.S.C. 154(b) by 307 days.

(21) Appl. No.: 10/092,442

(22) Filed: Mar. 8, 2002

(65) Prior Publication Data

US 2002/0131038 A1 Sep. 19, 2002

(30) Foreign Application Priority Data

Mar. 14, 2001 (JP) ........................................ 2001-072766

(51) Int. Cl.[7] .............................................. G01B 9/00
(52) U.S. Cl. ....................................................... 356/124
(58) Field of Search ................................ 356/124–128

(56) References Cited

U.S. PATENT DOCUMENTS

| 3,904,294 A | | 9/1975 | Gold et al. | |
|---|---|---|---|---|
| 4,549,081 A | * | 10/1985 | Ace | 250/372 |
| 4,611,913 A | * | 9/1986 | Sugino | 356/127 |
| 5,108,174 A | | 4/1992 | Lippens | |
| 5,548,396 A | * | 8/1996 | Morita et al. | 356/127 |
| 6,072,570 A | * | 6/2000 | Chipman et al. | 356/124 |
| 6,577,387 B2 | * | 6/2003 | Ross et al. | 356/124 |

FOREIGN PATENT DOCUMENTS

| JP | 57-020636 | 2/1982 |
|---|---|---|
| JP | 11-142241 | 5/1999 |
| JP | 11-211617 A | 8/1999 |

OTHER PUBLICATIONS

European Search Report completed Jun. 10, 2003 and issued on Jun. 18, 2003 in EP 02 00 4958.

* cited by examiner

*Primary Examiner*—Michael P. Stafira
(74) *Attorney, Agent, or Firm*—Griffin & Szipl, P.C.

(57) ABSTRACT

The present invention provides an inexpensive and convenient method and apparatus for measuring light transmittance of an optical lens having refractive power. The method comprises obtaining the light transmittance of an examined lens from a value corresponding to a ratio between the intensity of measured light detected by a light detector when the examined lens is placed in the path of the measured light emitted from a light source and an intensity of measured light detected by the light detector when there is no lens undergoing examination placed in the path of the measured light so that the measured light does not pass through an examined lens and provides a baseline value. Specifically, the present invention focuses (converges) the measured light at or in a vicinity of a position where the examined lens is disposed when the examined lens is placed in the path of the measured light.

16 Claims, 5 Drawing Sheets

DIOPTRIC POWERS OF SPECTACLE LENSES

METHOD FOR MEASURING LIGHT TRANSMITTANCE AND APPARATUS THEREFOR

FIELD OF THE INVENTION

The present invention relates to an improved method for easily measuring the light transmittance of an optical lens, such as a spectacle lens or an eyeglass lens, and an apparatus therefor. In the context of this disclosure, spectacle lens shall include optical lenses used to make spectacles, eyeglasses, monocles, and other optical lenses worn by a person to correct visual acuity. In addition, the present invention can be utilized to determine the light transmittance of an optical lens that is neither worn by a person nor used to correct visual acuity. Also, in the present disclosure, the terms "transmittance" and "transmission" are considered synonymous and equivalent terms and are used interchangeably.

BACKGROUND OF THE INVENTION

In spectacle lens stores (e.g., eyeglass stores and optometrist offices), it is occasionally required that the light transmittance of a spectacle lens with respect to ultraviolet light or visible light be examined and determined as one of several optical lens properties evaluated when choosing a spectacle lens for a customer. Typically, one favored method for measuring the light transmittance of a spectacle lens involves using an integrating sphere in an optical measuring system for detecting light accurately without causing errors in the measured value, even when the measured light is diffused or converged by the lens for examination (also referred to as the examined lens). However, the integrating sphere is expensive thereby making it difficult and costly to distribute integrating spheres widely among spectacle lens stores. Therefore, apparatuses for easily measuring light transmittance of a spectacle lens without using an integrating sphere have been proposed. For example, one apparatus and corresponding method for correcting the value of light transmittance in accordance with the dioptric power of the lens for examination (i.e., examined lens) is disclosed in paragraph [0027] of Japanese Patent Application Laid-Open No. Heisei 11(1999)-211617.

FIG. 7 herein shows a diagram describing the principle of the method disclosed in Japanese Patent Application Laid-Open No. Heisei 11(1999)-211617, mentioned above. As shown in FIG. 7, rays of light to be measured L emitted from a light source 1 are arranged into parallel rays by a convex lens 2, then pass through a lens being examined 3 and an interference filter 4 before being detected by a light receiving element 5. The amount of light transmitted through examined lens 3, being light transmission of the light rays having a wavelength in the range narrowed by the interference filter 4, can be easily obtained by calculation from the ratio of the intensity of the light from light source 1 detected by the light receiving element 5 in the absence of the lens for examination 3 to the intensity of light detected from light source 1 by the light receiving element 5 when the lens for examination 3 is placed between the light source 1 and the light receiving element 5. With this method, the light receiving element 5 can achieve a relatively good measurement accuracy with respect to the transmitted light because the light rays from source 1 are arranged as close to parallel as possible before reaching the light receiving element 5. Therefore, the light transmittance can be measured with a relatively good accuracy.

In another method as shown in FIG. 8 herein, the convex lens 2 shown in FIG. 7 is removed and the bundle of rays L originating from light source 1 are narrowed by a necessary amount by a pinhole in a pinhole element 7 before the rays L are sent to the lens for examination 3. In other words, the light rays L passing through the pinhole are sufficiently close to parallel so as to effect a reasonably accurate measurement of the light transmittance of the examined lens 3. In still another method as shown in FIG. 9, a convex lens 6 is disposed between the interference filter 4 and the light receiving element 5 in the optical system shown in FIG. 8 and the rays L that passed through the lens for examination 3 converge and are directed into the light receiving element 5.

However, the above methods for measuring light transmittance of an examined lens have a drawback in that the error in the light transmittance measurement increases as the dioptric power of the lens being examined increases. The present inventors have found that this increase in the measurement error of the light transmittance for an examined lens arises due to the following reason. When lenses have different dioptric powers, generally the curvatures of the surfaces of the lens at the front side and at the back side are different among the lenses. In other words, a spectacle lens having a first dioptric power will have a different front side and back side curvature than another spectacle lens having a different dioptric power. In accordance with the conventional light transmittance measuring methods, the sectional area of the bundle of light rays used for measuring the light transmittance of the lens that originate from source 1 and that pass through the examined lens 3 is relatively great. At least, the cross sectional area of the bundle of light rays is large enough to create a significant measuring error because each individual light ray strikes a different portion of the lens. Therefore, the curvature of the lens surface upon which a light ray impacts is significantly different depending on the position within the section of the bundle of rays, and this results in a refractive effect on each ray that is different depending on the position of the ray in the bundle of light rays. In addition, the thickness of the examined lens is also significantly different depending on the position of the ray within the bundle of light rays. Moreover, the above described effects are different between lenses having different dioptric powers. As the result, the area of the light ray bundle, the position on the lens upon which each light ray impacts, the direction and the amount of the incident rays of the light being used for measurement create different optical transmission effects depending on the dioptric power of the lens being examined within the light detection area of the light detector. It is believed that an error in the measurement of the light transmittance of the examined lens arises due to these effects.

Other factors magnify the light transmittance measuring error created by these optical effects. For example, when a light detector such as a photodiode is used, the sensitivity of light detection on the surface of the light detector is not always uniform along the entire surface of the light detector. In other words, the light detecting sensitivity of the photodiode varies due to differences in the light detecting sensitivity between different positions on the surface of the light detector. Therefore, should the position of the incident light ray change between measurements taken with the lens present and without the lens present, an additional error arises in the measurement of the light transmittance because the incident light ray will shift slightly due to the refractive effect of the examined lens which will cause the incident light to strike a different portion of the light detector and this different portion may have a different light detecting sensitivity. In accordance with the above conventional methods for measuring light transmittance, the sectional area and the incident direction of the bundle of rays used to measure light transmittance tend to effect the measured value of the light transmittance and this effect on the value of the measured light transmittance varies to a great degree depending on the dioptric power of the lens being examined. In addition, the position of impact of the incident light used to measure transmittance on the light detector changes to a great degree depending on the dioptric power of the lens for examination and an additional error is believed to arise from this effect as well.

Another factor affecting the light detector, such as a photodiode as described above, is that the sensitivity of light detection changes considerably depending on the angle of the incident light being measured with respect to the surface of the light detector. In other words, the actual sensitivity varies depending on the incident angle of the light rays. In the above conventional methods for measuring the light transmittance, each ray that is part of the bundle of light rays being measured passes through and is refracted by the lens undergoing examination at one of the lens's surface positions having a curved shape. Moreover, the degree of the refraction of each ray varies depending on the dioptric power of the lens being examined. As a result, the incident angle of each ray of incident light being measured has a different incident angle with respect to the light detector than the other incident light rays and yet another error is believed to arise from this factor.

Another factor to consider is that the total thickness of the lens undergoing examination, through which the bundle of incident light rays being measured will pass, is different depending on the dioptric power of the lens for examination. In other words, the dioptric power of a lens is dependent upon the thickness of the lens. Therefore, when the bundle of incident light rays to be measured has a relatively great sectional area and the dioptric power of the examined lens is great, then the amount of light attenuation cannot be neglected and an error is believed to arise in the measurement of light transmittance from this effect as well.

In view of these various sources of measuring errors, it is known that when using the apparatus for measuring spectacle lens light transmittance as disclosed in Japanese Patent Application Laid-Open No. Heisei 11(1999)-211617, the dioptric power of the examined lens must be known in advance in order to determine the light transmittance of the examined lens, which adversely affects the ease of the light transmittance measurement significantly.

The present invention endeavors to overcome the above drawbacks of the prior art light transmittance measuring systems and has an object of providing a method for measuring light transmittance which provides an inexpensive and easy light transmittance measurement of an optical lens having refractive (i.e., dioptric) power, thereby providing a method with excellent accuracy and an apparatus therefor.

BRIEF SUMMARY OF THE INVENTION

As the means for solving the above problems and drawbacks of the prior art methods, the present inventors have developed the following invention. The method according to the invention includes a method for measuring light transmittance which comprises obtaining the light transmittance of a lens undergoing examination from a value corresponding to a ratio between an intensity of measured light detected by a means for detecting light when the examined lens is placed in a path of incident light to be measured that is emitted from a light source, passes through the examined lens and reaches a means for detecting light and an intensity of measured light detected by the means for detecting light when no examined lens is placed in the path of the measured light so that the measured light does not pass through the lens undergoing examination, wherein when the measured light passes through the lens undergoing examination, the measured light is in a condition such that rays of the measured light converge at or in a vicinity of a position where the lens undergoing examination is disposed.

The apparatus according to the invention includes an apparatus for measuring light transmittance which comprises: (a) a light source emitting incident light to be measured, (b) a light detector for detecting the light to be measured, (c) an apparatus for holding a lens undergoing examination, wherein the apparatus for holding a lens is disposed between the light source and the light detector and can hold or release the lens undergoing examination as desired, and (d) a first convergence lens through which rays of the light to be measured converge at, or in a vicinity of, the position where the lens undergoing examination is disposed.

DETAILED DESCRIPTION OF THE INVENTION AND PREFERRED EMBODIMENTS

The method for measuring light transmittance and the apparatus for measuring light transmittance as two preferred major embodiments of the present invention (i.e., method and apparatus) will be described with reference to the Figures as follows.

Figure 1A:
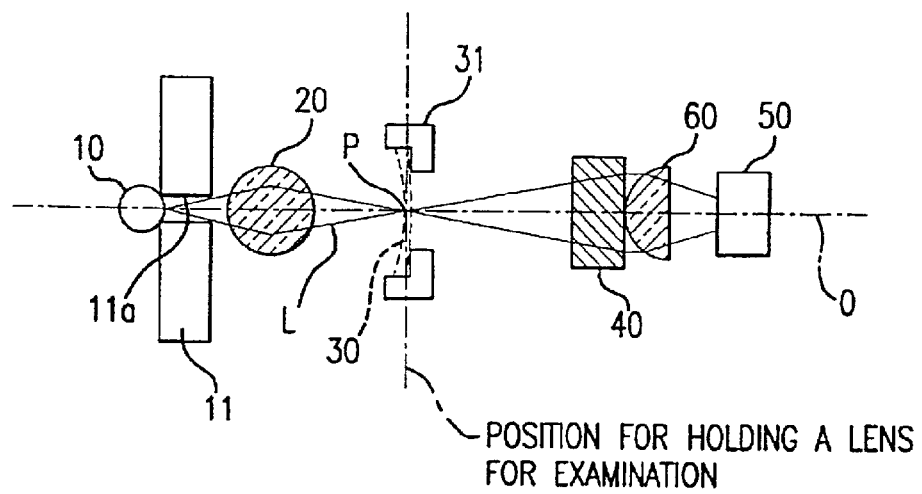
FIG. 1a shows a diagram exhibiting major portions of an optical system configuration for sub-apparatuses of an apparatus for measuring light transmittance as a first preferred apparatus embodiment of the present invention.
Figure 1B:
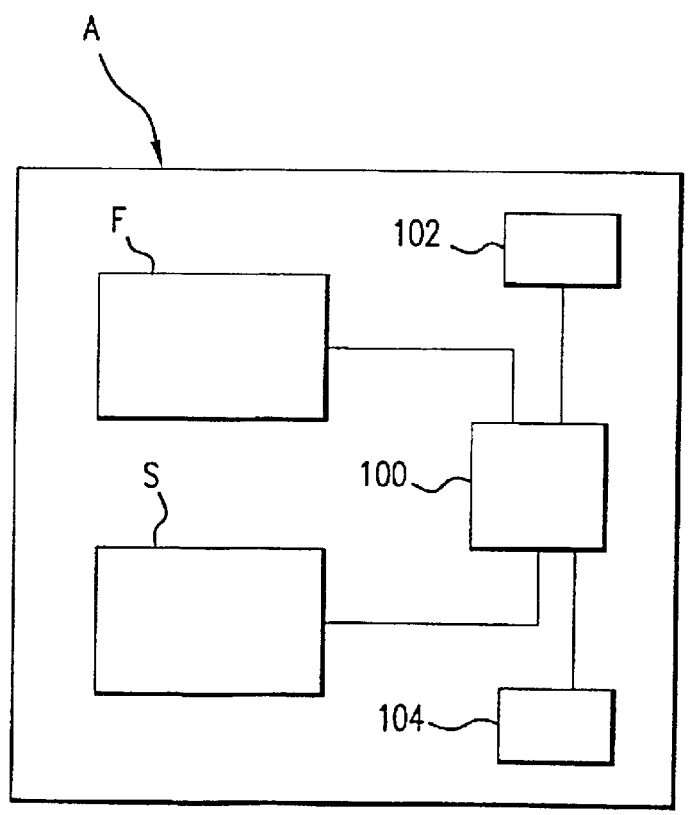
FIG. 1b schematically shows the apparatus for measuring the light transmittance of an examined lens according to the first preferred apparatus embodiment of the invention, wherein the apparatus includes two sub-apparatuses for measuring light transmittance.
Figure 6:
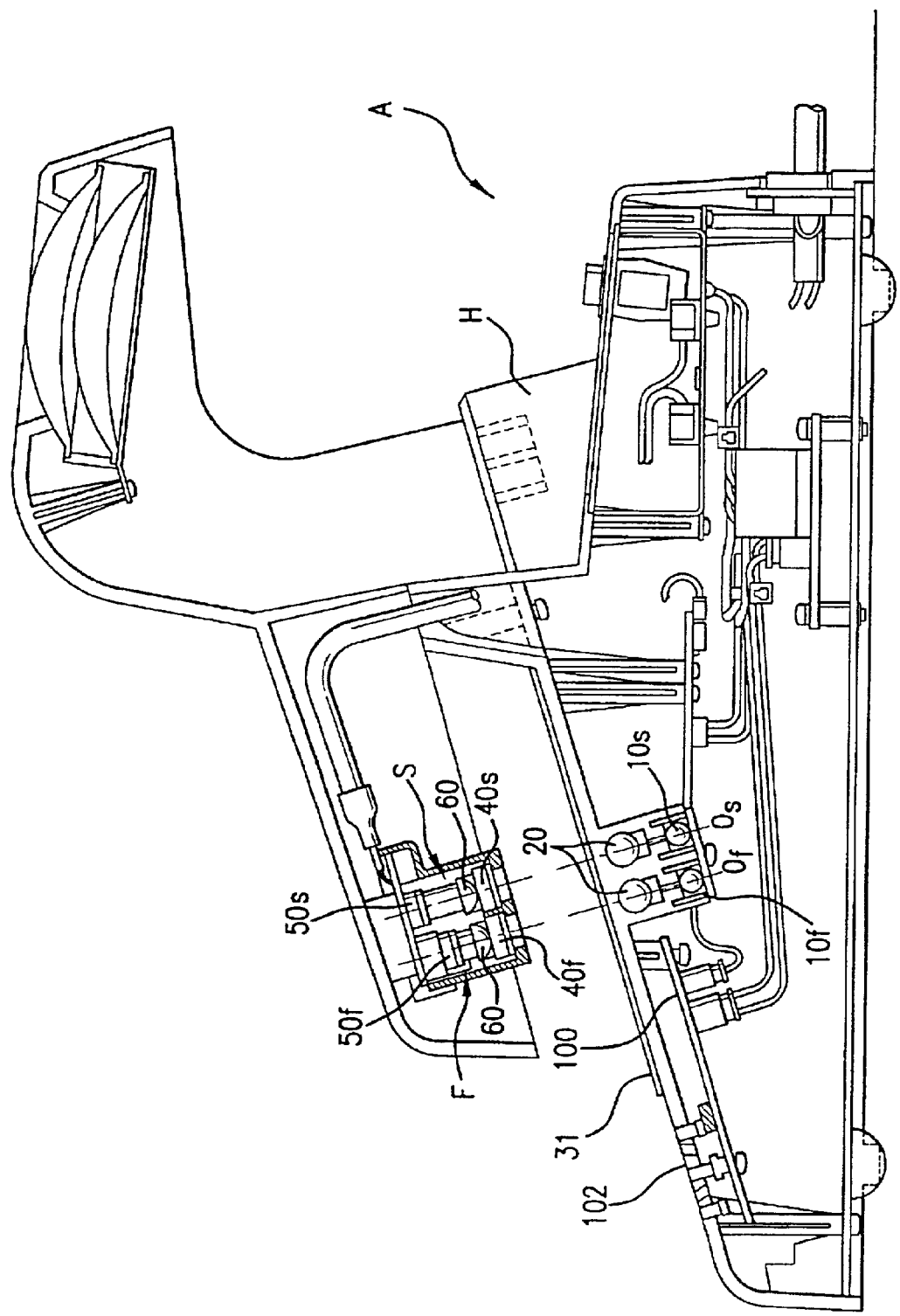
FIG. 6 shows apparatus A having sub-apparatuses F and S in accordance with one preferred embodiment of the present invention
Figure 7:
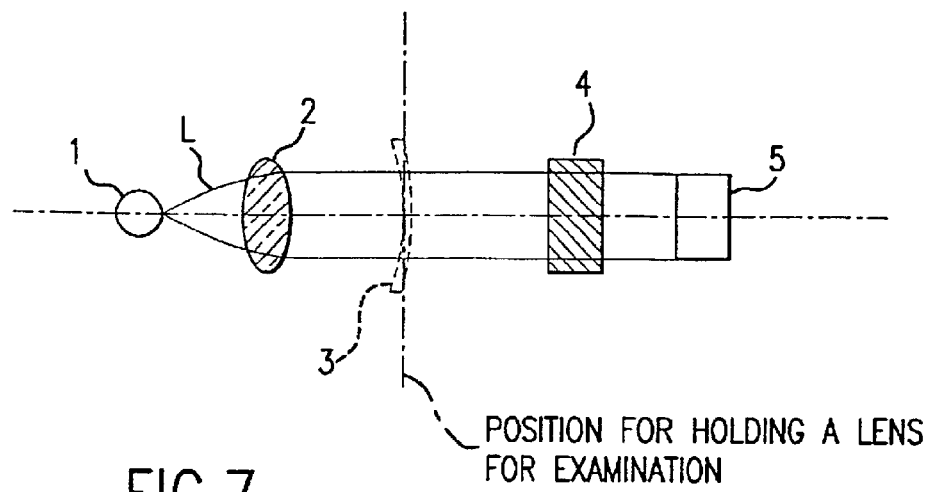
FIG. 7 shows a diagram exhibiting a conventional prior art method for measuring light transmittance.
Figure 8:
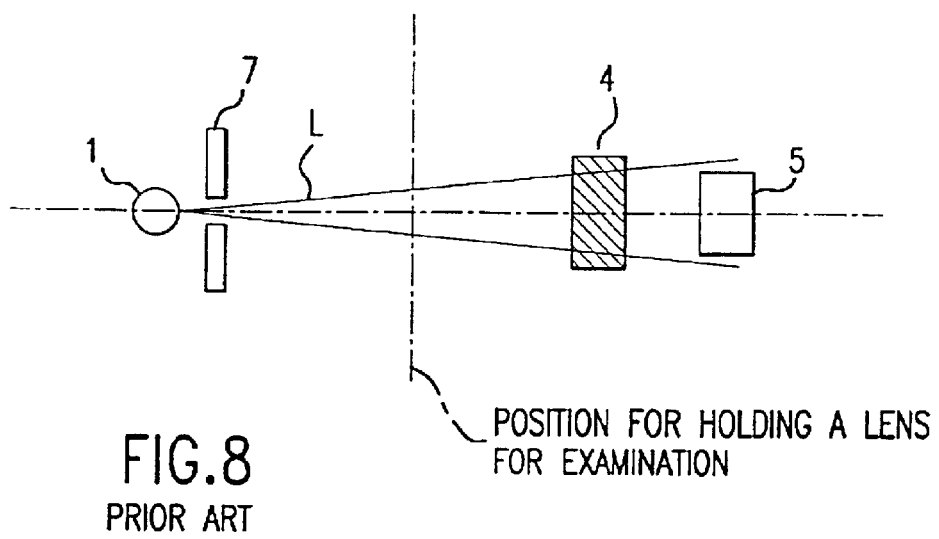
FIG. 8 shows a diagram exhibiting another conventional prior art method for measuring light transmittance.
Figure 9:
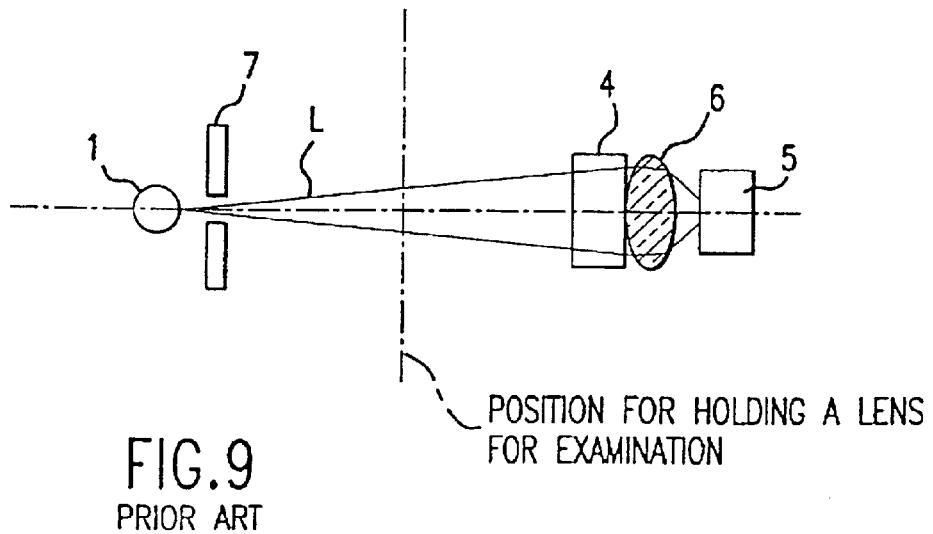
FIG. 9 shows a diagram exhibiting yet another conventional prior art method for measuring light transmittance.

To facilitate an easy understanding of the present invention, the embodiment directed to the apparatus in accordance with the instant invention will be described first. The apparatus A for measuring light transmittance according to the present invention includes two sub-apparatuses F and S as shown in FIGS. 1b and 6 for measuring light transmittance which utilize the same optical system configuration but operate on different optical axis and at different wavelengths for performing the measurement of the light transmittance. FIG. 1a explicitly shows the configuration of the optical system employed by both sub-apparatuses F and S.

In FIG. 1, a light source 10, a pinhole plate 11, a ball lens 20, an apparatus for holding a lens for examination 31 (also referred to as a "lens holding apparatus"), an interference filter 40, a hemisphere lens 60, and a light receiving element 50 are disposed successively from the left to the right as shown in FIG. 1 in a manner such that the optical axes of each component listed above is placed on the same optical axis O to form a first sub-apparatus for measuring the light transmittance property of an examined lens 30.

Light source 10 emits rays L that will be measured ultimately by light receiving element 50. A light emitting body which emits light of a specific wavelength and intensity is used as the light source 10 to enhance the measurements. In the apparatus A of the present embodiment, two, sub-apparatuses F and S for measuring light transmittance are constructed so that the light transmittance can be measured at two different wavelengths, such as 380 nm and 550 nm respectively, and on two different optical axes $O_f$ and $O_s$ respectively. In other words, sub-apparatuses F and S are identically configured to have the configuration shown in FIG. 1a and are used in combination to form the apparatus A as shown in FIG. 1b and FIG. 6. Therefore, for example, in sub-apparatus F for measuring light transmittance, a cold cathode tube for emitting light having a peak intensity at a wavelength of 390 nm can be used as the light source 10f, and for sub-apparatus S for measuring light transmittance, a cold cathode tube for emitting light having a peak intensity at a wavelength of 545 nm can be used as the light source 10s. As would be understood by one skilled in the art, any light source used as light source 10 would emit a range of wavelength frequencies, wherein each frequency emitted would have a given intensity. Generally, the relationship between the wavelength and the intensity of the emitted light can be graphically represented such that the wavelength of the emitted light is taken as the abscissa and the intensity of the emitted light is taken as the coordinate, and the wavelength of the peak intensity is readily apparent from the graph. Of course, a black light, a fluorescent lamp or an incandescent lamp would emit light with a peak intensity wavelength and may also be used as the light source 10.

Pinhole plate 11 is used for narrowing incident light emitted from light source 10 to the bundle of rays of light to be measured, being the light of measurement L both emitted from the light source 10 and narrowed by a pinhole 11a disposed on the optical axis O. The narrowing of the incident light from light source 10 selects out a partially collimated beam of light (i.e., bundle of light rays), which serves as the light of measurement L. The ball lens 20 is used for forming a focused image of the pinhole from the incident bundle of rays narrowed by the pinhole 11a on or in the vicinity of the surface of the lens 30 undergoing examination. Specifically, it is the surface 30s of the examined lens 30 that is closest to the light source 10 upon, or at least in the vicinity of, which the pinhole image is focused.

Pinhole plate 11 comprises a plate having a prescribed thickness so that the pinhole 11a has a prescribed depth in the direction of the optical axis O. This structure operates to eliminate unnecessary bundles of incident light rays, thereby providing a somewhat collimated bundle of rays. Another type of lens may be used in place of the above ball lens 20 (also referred to as "the first convergence lens"). As would be appreciated by those skilled in the art, any lens, such as a convex lens, which exhibits the effect of convergence so that the light of measurement L converges at a prescribed position such as on or near surface 30s can be used as the first convergence lens.

Figure 2:
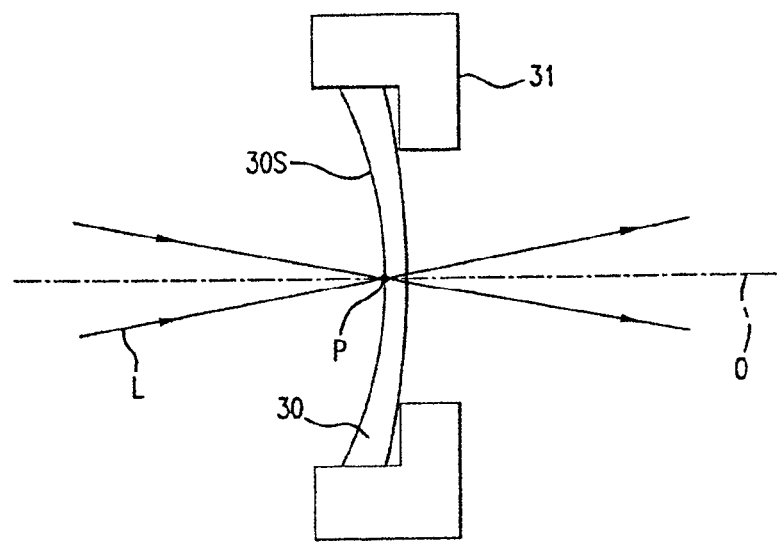
FIG. 2 shows an expanded view of a portion of the sub-apparatus configuration shown in FIG. 1.

Apparatus 31 for holding a lens for examination, also referred to as the lens holding apparatus 31, holds the lens to be examined 30 in a manner such that the lens being examined 30 can be held in place or removed as desired. In other words, the lens holding apparatus 31 holds the examined lens 30 in a releasable, non-permanent manner. One example of a lens holder 31 suitable for practicing the present invention includes a planar felt pad as shown in FIG. 6 having either ridges or grooves as shown in FIG. 2 for positioning and holding the examined lens 30. One skilled in the art would realize that other lens holding apparatuses are suitable for use in the present invention, and that the present invention is not limited to any one kind of lens holder. As shown in FIG. 2, lens holding apparatus 31 is constructed so that when the examined lens 30 is held, the point of convergence P of the light of measurement L, focused by the effect of the ball lens 20, places point P on, or in the vicinity of, the surface 30s of examined lens 30 that is on the side of lens 30 closest to the light source 10. It is preferable that the point of convergence P is on the surface of the examined lens 30 that is on that side of the lens 30 closest to the light source 10; however, the point of convergence P may be off the surface of the lens being examined 30 as long as the point of convergence P is in the vicinity of the surface of the examined lens.

The interference filter 40 is a filter that selectively transmits light having a particular wavelength. Specifically, filter 40 is chosen to be a filter that transmits light having a wavelength that is approximately near the wavelength used for performing the measurement according to the present invention. In one preferred embodiment of the present invention, for example, the wavelengths used for measuring light transmittance are 380 nm and 550 nm respectively for the F and S sub-apparatuses. In this case sub-apparatus F for measuring light transmittance would preferably utilize an interference filter 40f which selectively transmits light having a wavelength of 380±5 nm and sub-apparatus S would preferably have an interference filter 40s which selectively transmits light having a wavelength of 550±10 nm. Of course, as would be understood by one skilled in the art, the interference filter 40 is not limited to the specific wavelength filters discussed above, but should be suitably selected to correspond to transmit light including the wavelength used for the measurement in accordance with the present invention.

The hemisphere lens 60 (also referred to as the "second convergence lens") is a lens used for converging the bundle of light rays of measurement L at the light receiving sensor 50. In other words, hemisphere lens 60 focuses light rays L towards sensor 50 so that the transmitted light can be measured. Similarly to the case of the ball lens 20, another type or shape of lens may be used in place of the hemisphere lens 60 without departing from the spirit of the invention so long as the lens focuses the measuring light L onto the sensor. Thus, any lens exhibiting the effect of convergence such as a convex lens may be used. By using the hemisphere lens 60, the entire bundle of light rays of measurement L are focused for measurement as the incident light directed into an optimum area portion for receiving light of the light receiving element 50 so that the S/N ratio, (i.e., signal to noise ratio), of the light receiving element 50 is thus improved and the degree of error in the measurement can be decreased.

For the light receiving element 50, being a light detector, a photoelectric sensor for detecting the light of measurement L and for generating an output electric voltage signal corresponding to the amount of measured light is used. In the present embodiment, a photodiode is preferably used, although it is sufficient that the light receiving element 50 be a light detecting device that converts the energy of the incident light that is focused onto the light receiving surface of element 50 into electric energy proportional to the intensity of the measured light. Therefore, other light detectors, such as a phototransistor and a Cd cell, may be used to practice the light receiving element 50 in accordance with the present invention.

Using the above configuration for sub-apparatuses F and S for measuring light transmittance, the value of the output electric voltage or power from the light receiving element 50 can be used to determine the light transmittance of examined lens 30. Specifically, when the examined lens 30 is held by the lens holding apparatus 31 and the light source 10 is used to generate the bundle of light rays L that is measured by the light receiving element 50, then a value of the output electric voltage or power from the light receiving element 50 is generated that corresponds to the amount of light transmitted when the examined lens 30 is arranged and present along the optical axis O. The electric output voltage or power generated by the light receiving element 50 when the examined lens 30 is held in place along the optical axis O by the lens holder apparatus 31 is referred to as the lens transmission value. Then a light transmittance measurement can be taken corresponding to the condition when there is no lens 30 to be examined present in the lens holding apparatus 31. In other words, the condition wherein the lens holding apparatus 31 is empty is a baseline condition (i.e., no lens 30 is present in the lens holder 31) and the value of the electric output voltage or power generated by the light receiving element 50 under this baseline condition corresponds to essentially a 100% or complete transmission (i.e., transmission T=1) of the incident light bundle L. The value of the electric output voltage or power generated by the light receiving element 50 under the baseline condition is referred to as the baseline value. The optical light transmittance property T of the examined lens 30, also referred to as the transmission T, can be expressed as the ratio (N'/N) of these two values, being the lens transmission value N' and the baseline value N as is commonly known in the art, such as discussed in chapter 8.6 of Smith's Modem Optical Engineering textbook (2000).

Apparatus A as shown in FIG. 1b and FIG. 6 includes a microprocessor 100 electronically connected to the light receiving elements 50f and 50s of sub-apparatuses F and S. The microprocessor receives the signals corresponding to the lens transmission value N' and the baseline value N from each light detector 50f and 50s of sub-apparatuses F and S and then calculates the light transmittance T for the examined lens 30. The microprocessor then outputs the value of the light transmittance T to a display element 102 such as a computer screen or a printer, or stores the transmission value T in a memory unit 104 for later retrieval and use. As would be appreciated by one skilled in the art, the microprocessor can receive signals from sub-apparatus F and/or sub-apparatus S. When the examined lens 30 is examined sequentially by sub-apparatus F and then by sub-apparatus S or vice versa, the microprocessor can calculate an average value for the light transmittance T of the examined lens 30 from the measured data provided by both sub-apparatus F and sub-apparatus S. In addition, apparatus A can operate to calculate out the light transmittance of the examined lens 30 from measured data provided by only sub-apparatus F or only sub-apparatus S, or apparatus A can operate to use data provided by both sub-apparatus F and sub-apparatus S to calculate an average value for the light transmittance T as described above.

Figure 3:
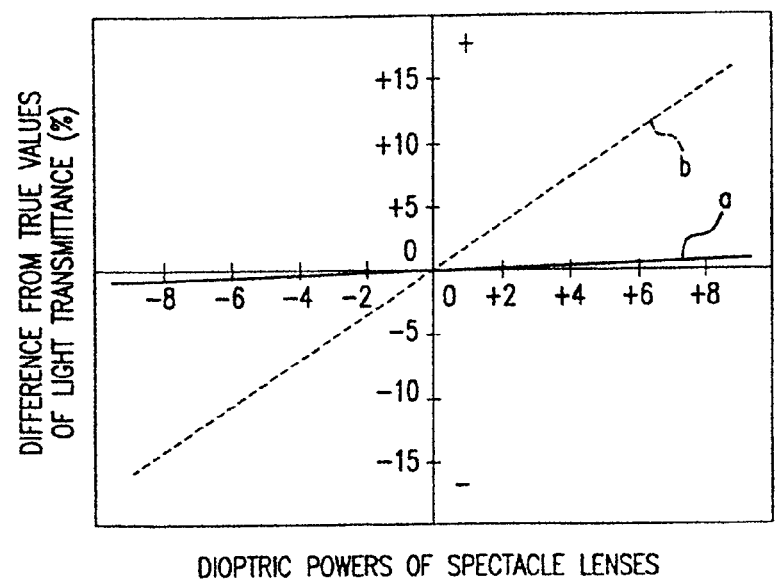
FIG. 3 shows a graph exhibiting the accuracy of the light transmittance measurement when the apparatus of the first preferred apparatus embodiment is compared to the light transmittance measurement of a conventional apparatus.

FIG. 3 is a graph exhibiting the improved measurement accuracy provided by the apparatus of the preferred embodiment of the invention described above when compared to the measurement accuracy of a conventional apparatus for measuring the transmittance of a lens. To generate the data for the graph shown in FIG. 3, various spectacle lenses (i.e., examined lenses 30) having different dioptric powers were used as the lens undergoing examination. True values of the light transmittance of these spectacle lenses were physically measured by using a high accuracy spectrometer comprising an integral sphere to provide a highly accurate baseline measurement, or "true value," that can be used for comparison between the measurements obtained by the apparatus of the present invention and the measurements obtained by the conventional apparatus. The difference from the true value, with the difference being expressed in the unit: %, is the difference between the measured value and the true value, subsequently divided by the true value. Line "a" represents the difference between the light transmittance obtained by using the apparatus of the present embodiment and the above true value of the light transmittance. Line "b" represents the difference between the light transmittance obtained by using the conventional apparatus and the above true value of the light transmittance. The graph employs the coordinate to represent the difference from the true values and the dioptric power of the examined lenses (the unit: dioptry) is taken as the abscissa.

As clearly shown in FIG. 3, the difference from the true value of line b, representing differences from the true value obtained by using the conventional apparatus to measure lens light transmission, was largely positive, (i.e., the obtained value was greater than the true value) when measuring lenses having positive dioptric powers and largely negative, (i.e., the obtained value was smaller than the true value), when measuring lenses having negative dioptric powers. In contrast, the difference from the true value of line a, representing differences from the true value obtained by using the apparatus of the present embodiment to measure lens light transmission, was small, (i.e., the obtained value was very close to the true value obtained by using the high accuracy spectrometer comprising an integral sphere when measuring of lenses having various dioptric powers over a wide range of dioptric powered lenses). Thus, it is clearly shown that a high accuracy measurement of lens light transmission could be achieved by using the apparatus of one preferred embodiment of the present invention. It is also clear from FIG. 3 that the conventional apparatus cannot achieve the same degree of measuring accuracy as the apparatus in accordance with the present invention.

It is believed that the above improved measuring accuracy result is obtained by the present invention because the light of measurement L passes through the lens undergoing examination under a focused condition such that the bundle of light rays to be measured converges approximately on the surface 30s of the lens being examined 30 which causes the sectional area of the light of measurement incident to the light detection surface of light receiving element 50 to remain constant and independent of the dioptric power of the lens being examined.

In addition, the sectional area of the bundle of light rays L being measured that pass through the lens undergoing examination can be remarkably decreased when the light of measurement passes through the examined lens in a focused condition such that the bundle of light rays to be measured converges approximately on the surface 30s of the lens being examined 30. Thus, the sectional area of the bundle of light rays to be measured that pass through the examined lens remains approximately constant when the point of convergence P is focused onto the surface 30s (also referred to as the "surface portion") of the examined lens 30, wherein surface 30s is the surface that is closest to the light source 10. In other words, lens surface 30s is that surface portion of examined lens 30 that is closest to the light source 10. It is believed that light transmittance measurement errors due to the differences in the position and the direction of the incident light, and due to the attenuation of the light intensity by the lens being examined caused by examining lenses of different dioptric power, being lenses having different lens curvatures, can be remarkably decreased based on the above described advantages of the present invention.

Figure 4:
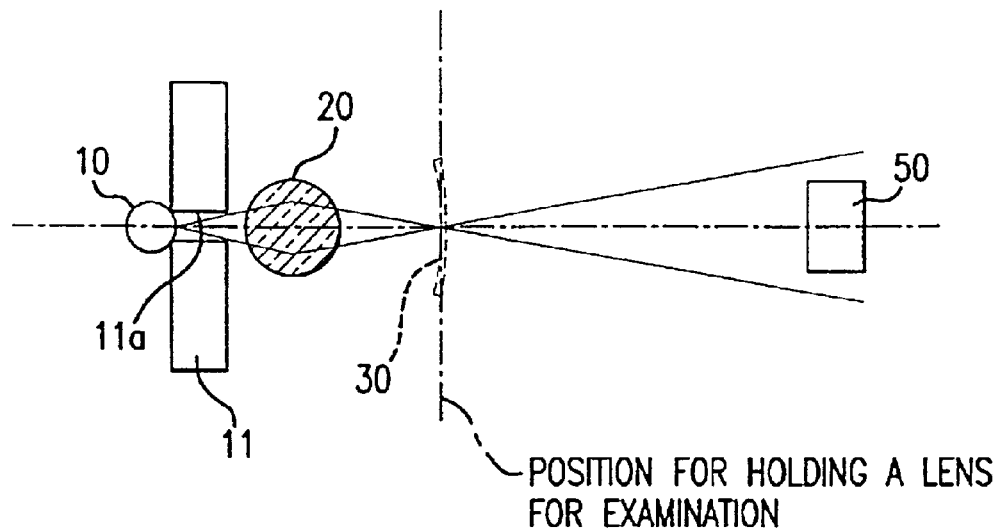
FIG. 4 shows a diagram exhibiting a modified sub-apparatus for measuring light transmittance as a second preferred apparatus embodiment of the present invention.
Figure 5:
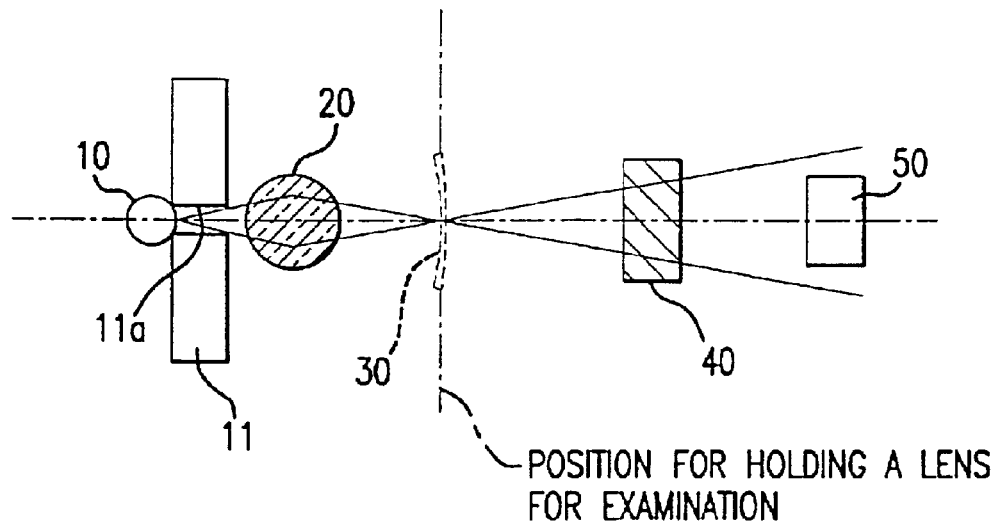
FIG. 5 shows a diagram exhibiting a modified sub-apparatus for measuring light transmittance as a third preferred apparatus embodiment of the present invention.

FIGS. 4 and 5 show diagrams exhibiting modifications to the apparatuses for measuring light transmittance as alternate preferred embodiments of the present invention. In the preferred embodiment shown in FIG. 4, the interference filter 40 and the hemisphere lens 60 are removed from the sub-apparatus F or S shown in FIG. 1. In the preferred embodiment shown in FIG. 5, the hemisphere lens 60 alone is removed from the sub-apparatus F or S shown in FIG. 1. The measurement of lens light transmittance can be satisfactorily conducted using these alternate sub-apparatuses when it is suitable for the object of the measurement. In other words, the object of the present invention can be sufficiently achieved by using the alternatively embodied sub-apparatuses having the modified constructions shown in FIGS. 4 and 5 so long as the light of measurement L passes through the examined lens 30 in the focused condition so that the light of measurement L converges "on or near" the surface 30s of the examined lens 30 closest to the light source 10 so that the sectional area of the light to be measured L incident into the light receiving element 50 is held approximately constant even when the dioptric power of the lens undergoing examination varies. Thus, the phrase "on or near" the surface 30s as used herein has a functional definition as stated above.

As described in detail in the above, the method for measuring light transmittance of an examined lens in accordance with the present invention comprises determining the light transmittance of a lens undergoing examination from a value corresponding to a ratio (i.e., transmission) of an intensity of light being measured and detected by a means for detecting light when the examined lens is placed in an optical path of the light being measured that was emitted from a light source and that reached the means for detecting light, wherein the light being measured passed through the examined lens, and an intensity of light being measured and detected by the means for detecting light when no lens to be examined is placed in the path of the measured light so that the measured light does not pass through any lens to be examinated. In this manner, the method for measuring transmitted light in accordance with the present invention compares the intensity of light transmitted through the examined lens to the intensity of light that does not pass through an examined lens. Furthermore, the method of measuring light transmittance of an examined lens is characterized by passing the light to be measured through the examined lens in a focused condition so that rays of light to be measured converge at, or in the vicinity of, a prescribed position along an optical axis where the lens undergoing examination is disposed.

To summarize succinctly the preferred first embodiment of the method in accordance with the present invention for measuring light transmittance of a lens undergoing examination, the steps include: (a) supplying light of a predetermined wavelength narrowed along an optical axis; (b) focusing the light to converge on or near a lens undergoing examination that is disposed on the optical axis so that a portion of the light is transmitted through the lens undergoing examination and subsequently measuring the intensity of the transmitted portion to generate a lens transmission value; (c) focusing the light to converge along the optical axis when the lens undergoing examination is not disposed on the optical axis and subsequently measuring the intensity of the light to generate a baseline value; and (d) determining the light transmittance of the lens undergoing examination from the lens transmission value and the baseline value.

In a first variation of the first embodiment of the method for measuring light transmittance summarized above, the light of a predetermined wavelength is supplied by a light source disposed along the optical axis, and wherein in step (b) when the light is focused to converge on or near the lens undergoing examination the light converges on or near a surface portion of the lens undergoing examination, wherein the surface portion is that portion of the lens undergoing examination that is closest to the light source.

In a second variation of the first embodiment of the method for measuring light transmittance, the method includes that the light transmittance of the lens undergoing examination is determined from a ratio between the lens transmission value and the baseline value.

In a third variation of the first embodiment of the method for measuring light transmittance, step (b) further comprises filtering the transmitted portion with an interference filter before measuring the intensity of the transmitted portion, and step (c) further comprises filtering the light with the interference filter before measuring the intensity of the light. The third variation of the first embodiment of the method for measuring light transmittance can be further modified so that step (b) further comprises converging the filtered transmitted portion with a second convergence lens onto a light detector so that the light detector can measure the intensity of the filtered transmitted portion, and step (c) further comprises converging the light with the second convergence lens onto the light detector so that the light detector can measure the intensity of the light.

In a fourth variation of the first embodiment of the method for measuring light transmittance, the light is focused in step (b) and in step (c) by a first convergence lens.

The apparatus of the present invention is used to practice the first embodiment of the method and its principal variations in accordance with the present invention. In this manner, the light transmittance of an optical lens having refractive power can be measured inexpensively and easily with excellent accuracy.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. A method for measuring light transmittance of a lens undergoing examination comprising the steps of:

(a) supplying light of a predetermined wavelength narrowed along an optical axis;

(b) focusing the light to converge on or near a lens undergoing examination that is disposed on the optical axis so that a portion of the light is transmitted through the lens undergoing examination and subsequently measuring the intensity of the transmitted portion to generate a lens transmission value;

(c) focusing the light to converge along the optical axis when the lens undergoing examination is not disposed on the optical axis and subsequently measuring the intensity of the light to generate a baseline value; and (d) determining the light transmittance of the lens undergoing examination from the lens transmission value and the baseline value.

2. A method for measuring light transmittance according to claim 1, wherein the light of a predetermined wavelength is supplied by a light source disposed along the optical axis, and wherein in step (b) when the light is focused to converge on or near the lens undergoing examination the light converges on or near a surface portion of the lens undergoing examination, wherein the surface portion is that portion of the lens undergoing examination that is closest to the light source.

3. A method for measuring light transmittance according to claim 1, wherein the light transmittance of the lens undergoing examination is determined from a ratio between the lens transmission value and the baseline value.

4. A method for measuring light transmittance according to claim 1, wherein step (b) further comprises filtering the transmitted portion with an interference filter before measuring the intensity of the transmitted portion, and step (c) further comprises filtering the light with the interference filter before measuring the intensity of the light.

5. A method for measuring light transmittance according to claim 4, wherein step (b) further comprises converging the filtered transmitted portion with a second convergence lens onto a light detector so that the light detector can measure the intensity of the filtered transmitted portion, and step (c) further comprises converging the light with the second convergence lens onto the light detector so that the light detector can measure the intensity of the light.

6. A method for measuring light transmittance according to claim 1, wherein the light is focused in step (b) and in step (c) by a first convergence lens.

7. An apparatus for measuring light transmittance of a lens undergoing examination, the apparatus comprising a first sub-apparatus and a microprocessor, wherein the first sub-apparatus comprises:
a first light source emitting light of a predetermined first wavelength, wherein the first light source is disposed on a first optical axis;

a first light detector for detecting the light of the predetermined first wavelength, wherein the first light detector is disposed on the first optical axis and generates output signals in response to detecting light of the predetermined first wavelength;

a first lens holding apparatus disposed to hold a lens undergoing examination, wherein the first lens holding apparatus is disposed between the first light source and the first light detector and is positioned on the first optical axis, wherein the first lens holding apparatus releasably holds the lens undergoing examination; and a first convergence lens for converging rays of the light of the predetermined first wavelength at a first prescribed position, wherein the first prescribed position is on or near the lens undergoing examination when the first lens holding apparatus is holding the lens undergoing examination; and the microprocessor is electronically connected to receive
a lens transmission value from the first light detector when the lens is disposed in the first lens holding apparatus, and a baseline transmission from the first light detector value when no lens is disposed in the first lend holding apparatus, and the microprocessor is further disposed to calculate a ratio of the lens transmission value and the baseline transmission value and the send the ratio to one or more elements selected from the group consisting of a display element and a memory unit.

8. An apparatus for measuring tight transmittance according to claim 7, wherein the first prescribed position is on or near a surface portion of the lens undergoing examination, wherein the surface portion is that portion of the lens undergoing examination that is closest to the first light source.

9. An apparatus for measuring light transmittance according to claim 7, wherein the first sub-apparatus further comprises:
a second convergence lens disposed between the first lens holding apparatus and the first light detector, wherein the second convergence lens serves to converge rays of the light of the first predetermined wavelength into the first light detector.

10. An apparatus for measuring light transmittance according to claim 8, wherein the first sub-apparatus further comprises:
a second convergence lens disposed between the first lens holding apparatus and the first light detector, wherein the second convergence lens serves to converge rays of the light of the first predetermined wavelength into the first light detector.

11. An apparatus for measuring light transmittance according to claim 7, wherein the first sub-apparatus further comprises: a first interference filter disposed along the first optical axis and on a path of the rays of the light of the predetermined first wavelength, wherein the first interference filter transmits mostly light having a wavelength within a range about the first wavelength.

12. An apparatus for measuring light transmittance according to claim 8, wherein the first sub-apparatus further comprises: a first interference filter disposed along the first optical axis and on a path of the rays of the light of the predetermined first wavelength, wherein the first interference filter transmits mostly light having a wavelength within a range about the first wavelength.

13. An apparatus for measuring light transmittance according to claim 9, wherein the first sub-apparatus further comprises: a first interference filter disposed along the first optical axis and on a path of the rays of the light of the predetermined first wavelength, wherein the first interference filter transmits mostly light having a wavelength within a range about the first wavelength.

14. An apparatus for measuring light transmittance the apparatus comprising a first sub-apparatus, a second sub-apparatus, and a microprocessor electronically connected to receive signals from the first sub-apparatus and the second sub-apparatus, wherein the first sub-apparatus comprises:
a first light source emitting light of a predetermined first wavelength, wherein the first light source is disposed on a first optical axis;

a first light detector for detecting the light of the predetermined first wavelength, wherein the first light detector is disposed on the first optical axis and generates output signals in response to detecting light of the predetermined first wavelength;

a first lens holding apparatus disposed to hold a lens undergoing examination, wherein the first lens holding apparatus is disposed between the first light source and the first light detector and is positioned on the first optical axis, wherein the first lens holding apparatus releasably holds the lens undergoing examination;

a first convergence lens for converging rays of the light of the predetermined first wavelength at a first prescribed position, wherein the first prescribed position is on or near the lens undergoing examination when the first lens holding apparatus is holding the lens undergoing examination; and a first interference filter disposed along the first optical axis and on a path of the rays of the light of the predetermined first wavelength, wherein the first interference filter transmits mostly light having a wavelength within a range about the first wavelength; and wherein the second sub-apparatus comprises:

a second light source emitting light of a predetermined second wavelength, wherein the second light source is disposed on a second optical axis and the predetermined second wavelength is different from the predetermined first wavelength;

a second light detector for detecting the light of the predetermined second wavelength, wherein the second light detector is disposed on the second optical axis and generates output signals in response to detecting light of the predetermined second wavelength, and wherein the first lens holding apparatus is disposed between the second light source and the second light detector and is positioned on the second optical axis;

a second lens holding apparatus for holding the lens undergoing examination when the first lens holding apparatus is not holding the lens undergoing examination, wherein the second lens holding apparatus is disposed between the second light source and the second light detector and is positioned on the second optical axis, wherein the second lens holder releasably holds the lens undergoing examination;

an additional first convergence lens for converging rays of the light of the predetermined second wavelength at a second prescribed position, wherein the second prescribed position is on or near the lens undergoing examination when the second lens holding apparatus is holding the lens undergoing examination;

an additional second convergence lens disposed between the second lens holding apparatus and the second light detector, wherein the additional second convergence lens serves to converge rays of the light of the second predetermined wavelength into the second light detector; and a second interference filter disposed along the second optical axis and on a path of the rays of the light of the predetermined second wavelength, wherein the second interference filter transmits mostly light having a wavelength within a range about the predetermined second wavelength, wherein the microprocessor receives signals from the first light detector of the first sub-apparatus and receives signals from the second light detector of the second sub-apparatus, and the microprocessor determines the light transmittance of the lens undergoing examination based upon the signals received from the first light detector and the second light detector.

15. An apparatus for measuring light transmittance, the apparatus comprising a first sub-apparatus, a second sub-apparatus, and a microprocessor electronically connected to receive signals from the first sub-apparatus and the second sub-apparatus, wherein the first sub-apparatus comprises:

a first light source emitting light of a predetermined first wavelength, wherein the first light source is disposed on a first optical axis;

a first light detector for detecting the light of the predetermined first wavelength, wherein the first light detector is disposed on the first optical axis and generates output signals in response to detecting light of the predetermined first wavelength;

a first lens holding apparatus disposed to hold a lens undergoing examination, wherein the first lens holding apparatus is disposed between the first light source and the first light detector and is positioned on the first optical axis, wherein the first lens holding apparatus releasably holds the lens undergoing examination;

a first convergence lens for converging rays of the light of the predetermined first wavelength at a first prescribed position, wherein the first prescribed position is on or near the lens undergoing examination when the first lens holding apparatus is holding the lens undergoing examination and the first prescribed position is on or near a surface portion of the lens undergoing examination, wherein the surface portion is that portion of the lens undergoing examination that is closest to the first light source; and a first interference filter disposed alone the first optical axis and on a path of the rays of the light of the predetermined first wavelength, wherein the first interference filter transmits mostly light having a wavelength within a range about the first wavelength; and wherein the second sub-apparatus comprises:

a second light source emitting light of a predetermined second wavelength, wherein the second light source is disposed on a second optical axis and the predetermined second wavelength is different from the predetermined first wavelength;

a second light detector for detecting the light of the predetermined second wavelength, wherein the second light detector is disposed on the second optical axis and generates output signals in response to detecting light of the predetermined second wavelength, and wherein the first lens holding apparatus is disposed between the second light source and the second light detector and is positioned on the second optical axis;

a second lens holding apparatus for holding the lens undergoing examination when the first lens holding apparatus is not holding the lens undergoing examination, wherein the second lens holding apparatus is disposed between the second light source and the second light detector and is positioned on the second optical axis, wherein the second lens holder releasably holds the lens undergoing examination;

an additional first convergence lens for converging rays of the light of the predetermined second wavelength at a second prescribed position, wherein the second prescribed position is on or near the lens undergoing examination when the second lens holding apparatus is holding the lens undergoing examination;

an additional second convergence lens disposed between the second lens holding apparatus and the second light detector, wherein the additional second convergence lens serves to converge rays of the light of the second predetermined wavelength into the second light detector; and a second interference filter disposed along the second optical axis and on a path of the rays of the light of the predetermined second wavelength, wherein the second interference filter transmits mostly light having a wavelength within a range about the predetermined second wavelength, wherein the microprocessor receives signals from the first light detector of the first sub-apparatus and receives signals from the second light detector of the second sub-apparatus, and the microprocessor determines the light transmittance of the lens undergoing examination based upon the signals received from the first light detector and the second light detector.

16. An apparatus for measuring light transmittance, the apparatus comprising a first sub-apparatus, a second sub-apparatus, and a microprocessor electronically connected to receive signals from the first sub-apparatus and the second sub-apparatus, wherein the first sub-apparatus comprises:
a first light source emitting light of a predetermined first wavelength, wherein the first light source is disposed on a first optical axis;

a first light detector for detecting the light of the predetermined first wavelength, wherein the first light detector is disposed on the first optical axis and generates output signals in response to detecting light of the predetermined first wavelength;

a first lens holding apparatus disposed to hold a lens undergoing examination, wherein the first lens holding apparatus is disposed between the first light source and the first light detector and is positioned on the first optical axis, wherein the first lens holding apparatus releasably holds the lens undergoing examination;

a first convergence lens for converging rays of the light of the predetermined first wavelength at a first prescribed position, wherein the first prescribed position is on or near the lens undergoing examination when the first lens holding apparatus is holding the lens undergoing examination;

a second convergence lens disposed between the first lens holding apparatus and the first light detector, wherein the second convergence lens serves to converge rays of the light of the first predetermined wavelength into the first light detector; and a first interference filter disposed along the first optical axis and on a path of the rays of the light of the predetermined first wavelength, wherein the first interference filter transmits mostly light having a wavelength within a range about the first wavelength; and wherein the second sub-apparatus comprises:
a second light source emitting light of a predetermined second wavelength, wherein the second light source is disposed on a second optical axis and the predetermined second wavelength is different from the predetermined first wavelength;

a second light detector for detecting the light of the predetermined second wavelength, wherein the second light detector is disposed on the second optical axis and generates output signals in response to detecting light of the predetermined second wavelength, and wherein the first lens holding apparatus is disposed between the second light source and the second light detector and is positioned on the second optical axis;

a second lens holding apparatus for holding the lens undergoing examination when the first lens holding apparatus is not holding the lens undergoing examination, wherein the second lens holding apparatus is disposed between the second light source and the second light detector and is positioned on the second optical axis, wherein the second lens holder releasably holds the lens undergoing examination;

an additional first convergence lens for converging rays of the light of the predetermined second wavelength at a second prescribed position, wherein the second prescribed position is on or near the lens undergoing examination when the second lens holding apparatus is holding the lens undergoing examination;

an additional second convergence lens disposed between the second lens holding apparatus and the second light detector, wherein the additional second convergence lens serves to converge rays of the light of the second predetermined wavelength into the second light detector; and a second interference filter disposed along the second optical axis and on a path of the rays of the light of the predetermined second wavelength, wherein the second interference filter transmits mostly light having a wavelength within a range about the predetermined second wavelength, wherein the microprocessor receives signals from the first light detector of the first sub-apparatus and receives signals from the second light detector of the second sub-apparatus, and the microprocessor determines the light transmittance of the lens undergoing examination based upon the signals received from the first light detector and the second light detector.

* * * * *